(12) United States Patent
Nagarajan et al.

(10) Patent No.: US 6,240,066 B1
(45) Date of Patent: May 29, 2001

(54) DYNAMIC BANDWIDTH AND BUFFER MANAGEMENT ALGORITHM FOR MULTI-SERVICE ATM SWITCHES

(75) Inventors: Ramesh Nagarajan, Monmouth; Yung-Terng Wang, Marlboro, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/017,586

(22) Filed: Feb. 3, 1998

Related U.S. Application Data
(60) Provisional application No. 60/040,250, filed on Feb. 11, 1997.

(51) Int. Cl.[7] .................................................. H04L 12/56
(52) U.S. Cl. .......................................... 370/230; 370/395
(58) Field of Search ..................................... 370/230, 235, 370/357, 395, 229, 398, 468, 905

(56) References Cited

U.S. PATENT DOCUMENTS

| | | | |
|---|---|---|---|
| 5,757,771 | * | 5/1998 | Li et al. ................................ 370/235 |
| 5,982,748 | * | 11/1999 | Yin et al. .............................. 370/232 |

OTHER PUBLICATIONS

Keith W. Ross, "Multiservice Loss Models for Broadband Telecommunication Networks," pp. 145–150 (Springer–Verlag London Limited 1995).

Kiran M. Rege, "Equivalent Bandwidth and Related Admission Criteria for ATM Systems–A Performance Study,"Intern'l Journal of Communication Systems, vol. 7, 181–197 (1994).

Abhay K. Parekh and Robert G. Gallager, "A Generalized Processor Sharing Approach to Flow Control in Integrated Services Networks: The Single–Node Case," IEEE/ACM Transactions On Networking, vol. 1. No. 3 (Jun. 1993).

Zhi–Li Zhang, Don Towsley and Jim Kurose, "Statistical Analysis of Generalized Processor Sharing Scheduling Discipline," Computer Science Department, University of Massachusetts.

* cited by examiner

Primary Examiner—Hassan Kizou
Assistant Examiner—Ahmed Elallam

(57) ABSTRACT

Buffer and bandwidth resources in an ATM switch having a multi-class queue capable of servicing one or more ATM service classes are dynamically allocated at each call setup and release request. Buffer and bandwidth are dynamically partitioned in a manner that satisfies varied criteria including: tight allocation of buffer and bandwidth resources for each class, in desired proportions relative to the total respective available resources to meet the same QoS criteria within an ATM class, to implement the resource allocation described herein in a computationally simple and fast manner, to support multiple and varied QoS criterias, such as delay and loss, and thus be independent of the QoS criteria, to operate independently of the choice of the CAC/QoS computation engine, such that, given a set of connections and a desired QoS criteria the proposed resource allocation mechanisms are able to accommodate any desired method of computing the required bandwidth and buffer, and to provide a means for tuning the frequency of changes in the buffer or bandwidth allocation depending on which resource may be expensive to re-allocate.

14 Claims, 5 Drawing Sheets

DYNAMIC BANDWIDTH AND BUFFER MANAGEMENT ALGORITHM FOR MULTI-SERVICE ATM SWITCHES

RELATED APPLICATIONS

This application claims the benefit of provisional U.S. patent application Ser. No. 60/040,250 filed on Feb. 11, 1997.

FIELD OF THE INVENTION

The instant invention relates generally to ATM-based switching technology and, particularly, to a method of providing dynamic allocation of bandwidth and buffer resources capable of meeting quality of service ("QoS") requirements for each of multiple ATM service classes at an ATM switch.

BACKGROUND OF THE INVENTION

With the ever increasing demand for bandwidth and end-to-end performance guarantees presented by emerging networked applications, high speed networking techniques have been evolving at rapid pace in recent years. One of the most promising enabling technologies is the cell switching and networking techniques of ATM which provides the core transport needed to support multiple services at extremely high speed and fast decreasing cost. Central to this new technology are ATM-based switches that are capable of supporting diverse end-to-end quality-of-services through effective resources and traffic management methods which allow for efficient sharing of switch and network resources.

In recognizing such needs, a number of standards organizations have specified the service classes and various traffic management interfaces and attributes for ATM networks and services. For example, ATM Forum has defined five service categories: constant bit rate ("CBR"), real time variable bit rate ("rt-VBR"), non-real time variable bit rate ("nrt-VBR"), available bit rate ("ABR") and unspecified bit rate ("UBR"). Quality of service (QoS) is parameterized for each service and can be requested at call setup time for switched and permanent virtual connections. From the perspective of an ATM switch, this presents a challenge to resource and traffic management since one must allocate and share, in real-time, the resources efficiently among diverse services requested by connections.

Figure 1:
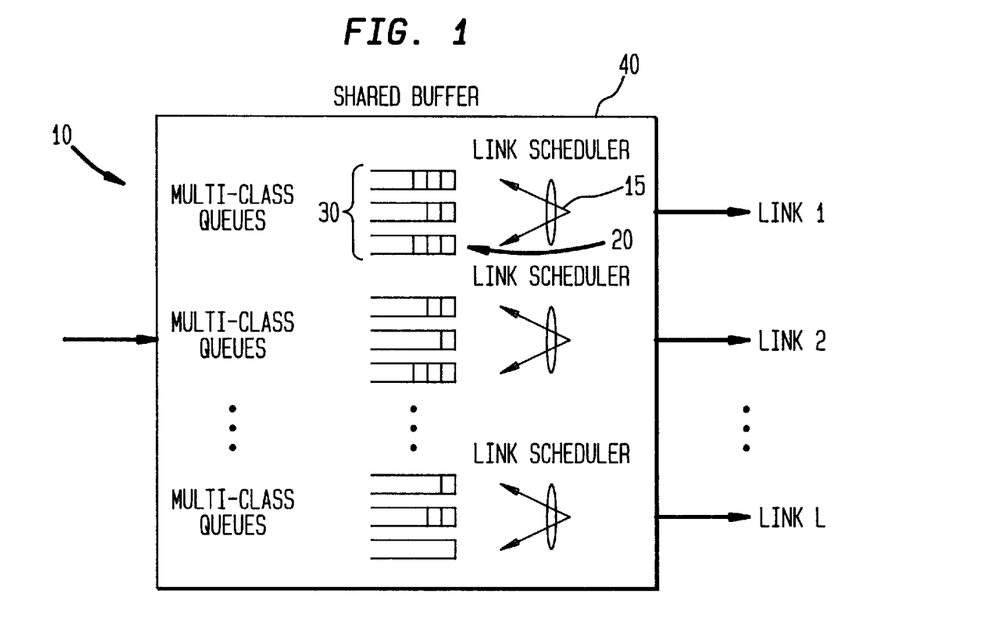
FIG. 1 is a general diagram illustrating an example ATM switching card supporting multiple class service.

As an example, a generic output-queuing ATM switch on a single ATM interface card 10 shown in FIG. 1. Typically such a card includes multiple physical ports 20 such as e.g., T1, DS3 and OC-3 ports. At each physical port, there are typically multiple queues 30 associated with multiple service classes such as CBR, rt-VBR, etc. In the extreme case there may be per-VC queuing. A buffer 40 is provided that may be shared by all the queues at all the ports or at least among queues for a single port. The bandwidth is shared through e.g., some variation of a weighted round-robin discipline as indicated by link schedulers 15 in FIG. 1.

In a queuing-theoretic framework, the ATM switch of FIG. 1 translates to a multi-queue, multi-server environment with a round-robin service discipline within the service classes at a port and a shared buffer across all the ports. From the QoS point of view, the focus relates to the performance bounds for individual connections or at least on a per-queue (class) basis. The literature is severely limited in terms of results for such queuing systems even in the case of a single-server system, however, there has been recent work done on deterministic performance bounds for generalized processor sharing queuing systems, e.g., as described in A. K. Parekh and R. Gallager, "A Generalized Processor Sharing Approach to Flow Control in Integrated Services Networks: The Single Node Case," *IEEE/ACM Transactions on Networking*, Vol. 1, No. 3, pp. 344–357, June 1993, hereby incorporated by reference as if fully set forth herein. However, these deterministic bounds are typically fairly loose, lead to poor link utilization and hence are of limited usefulness.

There has also been work on statistical performance bounds which appear promising, but more work needs to be done to make these bounds suitable for a real-time call admission control ("CAC"). See, Zhi-li Zhang, et al., "Statistical Analysis of Generalized Processor Sharing Scheduling Discipline," IEEE Journal of Selected Areas in Communication Vol. 13, No. 6 p 1071–80 (August 1995), hereby incorporated by reference as if fully set forth herein.

There however, exists literature on performance bounds for single-queue, single-server fluid models. Additionally, the related problem of Call Admission Control in these systems has been studied extensively where the typical problem addressed is how to estimate the steady state loss or delay performance given fixed buffer and bandwidth resources and a set of connections with specified traffic descriptors and given QoS requirements. In reality, however, buffer and bandwidth are, and need to be, shared among several services as connections arrive and depart in unpredictable patterns. Thus, it would be highly desirable to provide a dynamic scheme by which bandwidth and buffer are managed simultaneously and dynamically allocated to each service. See also Keith Ross, "Multiservice Loss Models in Broadband Telecommunication Networks" (1995) and Raffaele Bolla et al., "Bandwidth Allocation and Admission Control in ATM Networks with Service Separation," IEEE Communications Magazine Vol. 35, No. 5 (May 1997), hereby incorporated by reference as if fully set forth herein. These references consider dynamic bandwidth allocation but do not consider the buffer resource. Additionally, "Bandwidth Allocation and Admission Control in ATM Networkds with Service Separation," supra, only allows for homogenous connections, i.e., identical traffic parameters, and QoS requirements within a service class. This is not a realistic scenario in practice.

SUMMARY OF THE INVENTION

The instant invention is a method for resource allocation involving the notion of multiple classes to be allocated buffer and bandwidth resources separately. In the context of the ATM interface card, the individual buffer and bandwidth requirements for ATM service classes are determined separately given the traffic load and QoS requirements. Hence, multiplexing effects only within a service class are accounted for with service class interactions being decoupled. For connection admission purposes, a check is made as to whether the aggregate of the service class buffer and bandwidth requirements is less than total amount of buffer and bandwidth. Since the notion of a resource allocation class is general, however, one can choose to define resource allocations to different classes. For example, nrt-VBR connections that request different CLR QoS' may be defined as belonging to different classes.

Advantageously, the inventive method for dynamic buffer and bandwidth partitioning manifests several desired properties including: A) tight allocations of buffer and bandwidth; B) allocation of buffer and bandwidth in controlled (weighted) proportion (relative to the total available resources) for nrt-VBR; C) computationally fast operation to allow for real-time execution; D) support of multiple and varied QoS criteria; E) operating independent of the choice of the CAC/QoS computation engine for each class; and F) enablement of controlled rate of changes in the buffer and/or bandwidth allocation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

The instant invention is a computer implemented method for allocating buffer and bandwidth resources of an ATM switch wherein buffer and bandwidth resources are separately allocated among multiple classes. The essence of the method is to execute the Connection Admission Control ("CAC") function of determining admissibility of a connection given a set of constraints per class that includes buffer, size, bandwidth, QoS requirements and connections traffic parameters. Furthermore, the method determines buffer and bandwidth allocation to ensure that the aggregate of the per class requirements never exceeds the total available resources and that all resources are efficiently utilized. Dynamic buffer and bandwidth partitioning in accordance with the present invention operates in a manner satisfying the following six criteria: First, buffer and bandwidth resources are tightly allocated. Thus, with one of the resources fixed, for example the buffer size, the bandwidth allocation cannot be decreased further while still supporting the QoS requirements of the existing connections. While, this requirement ensures maximum usage of the buffer and bandwidth resources, its application may be relaxed to obtain better performance with respect to the frequency of buffer and bandwidth allocations, as discussed further, below.

Figure 2:
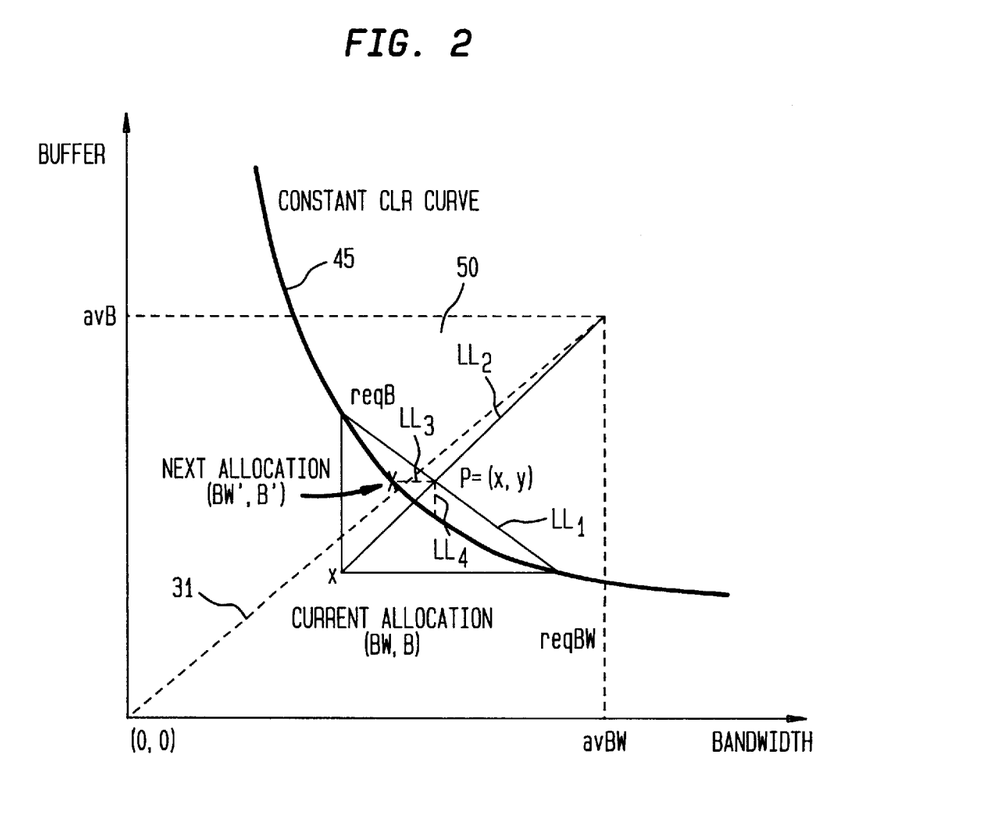
FIG. 2 is a general diagram illustrating buffer and bandwidth allocation at connection arrival instants.

Second, for all service categories other than rt-VBR, buffer and bandwidth are allocated in equal proportion relative to the total respective available resources as shown in FIG. 2, to meet the same QoS criteria within an ATM class. It is straightforward, in principle, to incorporate a priori knowledge of the characteristics of the other classes and allow general allocation ratios, i.e. other than equal proportion.

The third criteria is to implement the resource allocation described herein in a computationally simple and fast manner. It would be undesirable if the method of the present invention inhibited in any way the very high call throughput that ATM switches are designed to support.

Fourth, the method should support multiple and varied QoS criterias, such as delay and loss, and thus be independent of the QoS criteria. Fifth, the method should operate independently of the choice of the CAC/QoS computation engine, such that, given a set of connections and a desired QoS criteria the proposed resource allocation mechanisms are able to accommodate any desired method of computing the required bandwidth and buffer. The mechanism should only make an intelligent choice from among the feasible points in the buffer-bandwidth space that satisfy the QoS requirement but the feasible points themselves are defined by the QoS computation engine.

Finally, it would be desirable to provide a means for tuning the frequency of changes in the buffer or bandwidth allocation depending on which resource may be expensive to re-allocate. For example, (re)-allocation operations of the buffer or bandwidth on a class-basis may require programing ATM chipsets at the interface card which may be expensive depending on particular interface card architectures.

Figure 3:
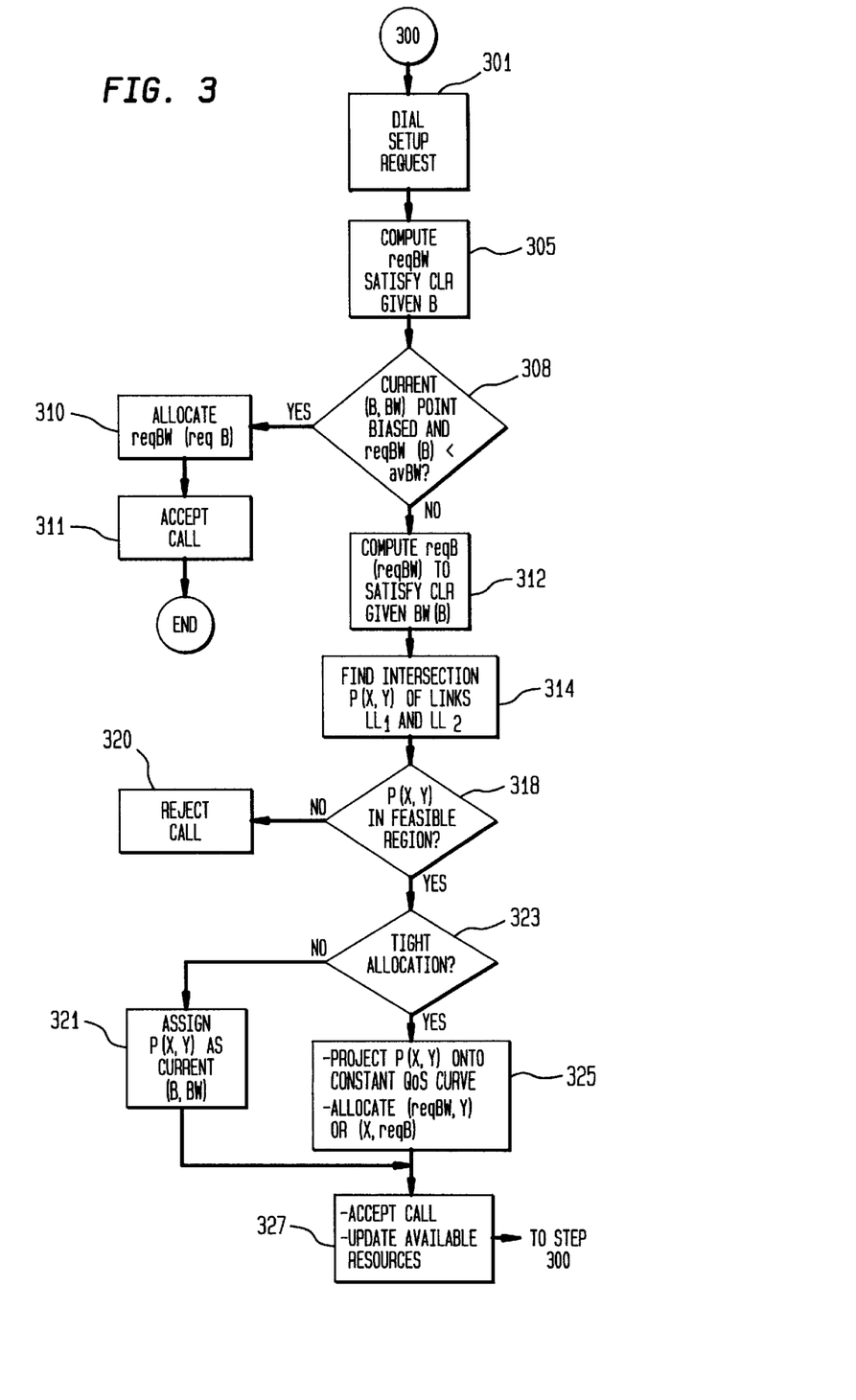
FIG. 3 illustrates the flow chart of the dynamic resource allocation algorithm 300 of the invention.

FIG. 3 illustrates the detailed method that is executed at each connection setup instant with a pictorial depiction of the operation of the method being shown in the buffer/bandwidth allocation graph of FIG. 2. For purposes of concreteness and ease of presentation, the inventive method will be described with reference to a nrt-VBR ATM service. However, according to the principles described herein, the algorithm is easily generalized to any ATM service classification with one or more QoS types. For the nrt-VBR ATM service category, the cell loss ratio (CLR) is the critical QoS metric depicted as curve 45 in the buffer/bandwidth allocation graph of FIG. 2. Illustratively, the QoS metric curve defines the locus of points representing, e.g., a one percent (1.0%) cell loss, or cell delay variation, etc. and is determined by any chosen QoS computation engine. Particularly, as indicated in FIG. 2, the feasible region 50 for allocating resources is defined as having the QOS curve 45 as the lower boundary and the total available resources as the upper boundaries region. Thus, any point of buffer and bandwidth allocation picked on this curve or within the feasible region 50 will satisfy the cell loss criteria. In accordance with FIG. 2, the buffer and bandwidth allocation for the nrt-VBR class at any given time is denoted as $B_{nrt\text{-}VBR}$ and $BW_{nrt\text{-}VBR}$, respectively. The required computed buffer and bandwidth to accommodate the new connection is denoted as $reqB_{nrt\text{-}VBR}$ and $reqBW_{nrt\text{-}VBR}$, in the following algorithm. The total available bandwidth and buffer for the class is denoted as $avB_{nrt\text{-}VBR}$ and $avBW_{nrt\text{-}VBR}$. Another quantity employed in the algorithm, as will be explained, is a tuning factor $F_a \in R^+$ which is used to control the frequency of allocations of buffer and bandwidth in accordance with the sixth requirement mentioned above.

As shown in FIG. 3, method 300 of the present invention begins with step 301 to determine if a received call is a setup request, i.e., a connection arrival event. Treatment of call release requests is described below in connection with FIG. 6. If the call is a setup request, then the new $reqBW_{nrt\text{-}vbr}$ needed to support the most stringent QoS metric, e.g., CLR, is computed given the present buffer allocation of $B_{nrt\text{-}vbr}$, with the assumption that $B_{nrt\text{-}vbr}$ remains unchanged. Note that any desired CLR computation engine may be used to determine $reqBW_{nrt\text{-}vbr}$ in accordance with the fifth criteria discussed above. Next, at step 308, a decision is made as to whether the current operating point (reqBW$_{nrt\text{-}VBR}$, B$_{nrt\text{-}VBR}$) is not unduly biased towards a small buffer allocation and whether the required BW is available i.e.

$$B_{nrt\text{-}VBR}/avB_{nrt\text{-}VBR} < 1/F_a^* \ req \ BW_{nrt\text{-}VBR}/avBW_{nrt\text{-}VBR} \quad (1).$$

and $$req \ BW_{nrt\text{-}VBR} < avBW_{nrt\text{-}VBR}$$

If the current operating point is not unduly biased and the required BW is available, then at step 310 the reqBW$_{nrt\text{-}VBR}$ is simply allocated without changing the buffer allocation B$_{nrt\text{-}vbr}$ and the call is accepted at step 311.

Note that the factor $F_a$ in equation (1) determines the frequency with which buffer re-allocations occur. Note that a large value of $F_a$ will permit the bandwidth allocation to violate the second criteria discussed above, while allowing for a slower frequency of buffer adjustments. Note that the new operating point is on the constant CLR curve and hence the first criteria is satisfied. It should be understood that if it is desired to keep the bandwidth allocation relatively constant and change only the buffer allocation, then the procedure implemented at step 305 would be reversed and the new buffer allocation would be determined with the bandwidth allocation unchanged. It will be readily apparent to one skilled in the art as to how to suitably modify condition of equation (1) to determine trigger points for bandwidth re-allocation.

If, at step 308, it is determined that the operating point (reqBW,B) is unduly biased toward a large buffer allocation, or reqBW>avBW, or the first criteria of tight allocation does not have to be strictly adhered to and it is desired to limit the frequency of both bandwidth and buffer allocations as detailed in the sixth criteria, then the algorithm proceeds to step 312 to compute the new reqB$_{nrt\text{-}vbr}$ needed to support the CLR assuming bandwidth allocation BW$_{nrt\text{-}vbr}$ remains unchanged. Next, at step 314, a computation is made to find the intersection P=(x,y) of the line LL$_1$ connecting (Bw$_{nrt\text{-}VBR}$, reqB$_{nrt\text{-}VBR}$) and (reqBW$_{nrt\text{-}VBR}$,B$_{nrt\text{-}VBR}$) as shown in FIG. 2, and the line LL$_2$ connecting the current operating point (Bw$_{nrt\text{-}VRB}$,B$_{nrt\text{-}VBR}$) and the available buffer and bandwidth (avB$_{nart\text{-}vbr}$, avBW$_{nrt\text{-}vbr}$). Then, at step 318, a determination is made whether the intersecting point P(x,y) lies within the feasible region 50, i.e., whether the condition (y<avB$_{nart\text{-}vbr}$) and (x<avBW$_{nrt\text{-}vbr}$) is satisfied. If this condition is not satisfied, then the call is rejected as indicated at step 320 as there are not enough available resources. If the intersecting point P(x,y) lies within the feasible region 50, then a determination is made at step 323 as to the desired tightness of buffer/bandwidth allocation. If a loose resource allocation is acceptable, then, as indicated at step 321, the computed intersection point P is the new current operating point. The call is then accepted as indicated at step 329 and the new aggregate available buffer and bandwidth resources for the multiple service classes is updated accordingly. Note, as shown in FIG. 2, the convexity of the CLR curve 50 ensures that point P(x,y) is within the feasible buffer/bandwidth allocation region 50 with respect to meeting the QoS criteria. In this case, while the first requirement is not strictly adhered, there is a gain in terms of limiting the frequency of buffer and bandwidth allocations. It should be understood that the aggregate total resource allocations for all of the multiple ATM service classes sharing the total available resources are taken into account in the algorithm through the avB and avBW boundary changes. Specifically, the avB and avBW boundary represents how much is available to the particular class. Thus, if there is an allocation to a class, e.g., nrt-VBR ATM, the available resources boundary will change for the other classes, e.g., CBR.

If, at step 323 of FIG. 3, tight allocation is to be strictly met at the expense of a higher frequency of bandwidth allocation as controlled by $F_a$, then, as indicated at step 325, the projection of point P on the constant CLR curve 50 in FIG. 2, is computed. Thus, e.g., a quick computation is made to find the reqBW$_{nrt\text{-}vbr}$ needed to support the most stringent QoS metric, e.g., CLR, given the buffer allocation y. Specifically, this is done by projecting line LL$_3$ from the point P(x,y) onto the QoS metric curve keeping buffer allocation y constant and only changing the reqBW to arrive at the next allocation at point BW',B' as indicated in FIG. 2.

Alternatively, if hardware architecture allows for more frequent buffer changes, line LL$_4$ may be projected onto the QoS metric curve from point P(x,y) keeping bandwidth allocation x constant and only changing the reqB. Thus, at step 325, depending upon the projection, the new required bandwidth (or buffer) is allocated. Finally, at step 329, the call is accepted and the new aggregate available buffer and bandwidth resources for the multiple service classes is updated accordingly, awaiting the new connection setup or release request.

It should be understood that as long as the dynamic buffer and bandwidth resource allocations are projected onto the QoS metric curve, the allocations are tight and the ATM service class is not using more resources than it should. Additionally, if tight resource allocation is desired, then either bandwidth or buffer allocation has to be adjusted accordingly for each call in the manner described with reference to step 323, FIG. 2. Thus, depending upon the particular hardware architecture, if for example, buffer changes are more expensive than bandwidth changes, then the frequency with which the buffer is changed would be limited while more bandwidth changes are made to occur. Likewise, if the hardware architecture dictates that allocating bandwidth is more expensive, the frequency with which the bandwidth is changed would be limited and more buffer changes will be made to occur. These changes are controlled in accordance with equation 1) by incorporating tuning factor $F_a$ to control the distance of the operating point from intersecting line 31, indicating equal allocation of bandwidth and buffer resources for a given ATM service class. It may also be undersirable to change buffer (bandwidth) allocation when effective BW depends on buffer (bandwidth) allocation. In this case you don't want to change buffer because then you have to recompute effective BW for all existing calls not only new connections and this increases computational cost. Effective bandwidth is more fully described in Gibbens, R. J. and Hunt, P. J. "Effective Bandwidth for the Multitype US Channel" in Queuing Systems vol. 9 p. 17–28(1997), incorporated by reference as if fully set forth herein.

As the computational requirements of implementing the present invention reveal, in the best case, step 305 only requires the computation of the required bandwidth given the buffer allocation. In the worst-case, only two additional similar computations are carried out at steps 312 as spelled out in 325. Provided the underlying QoS computation engine is efficient, minimal additional computations are required, thus satisfying the third criteria.

Figure 4:
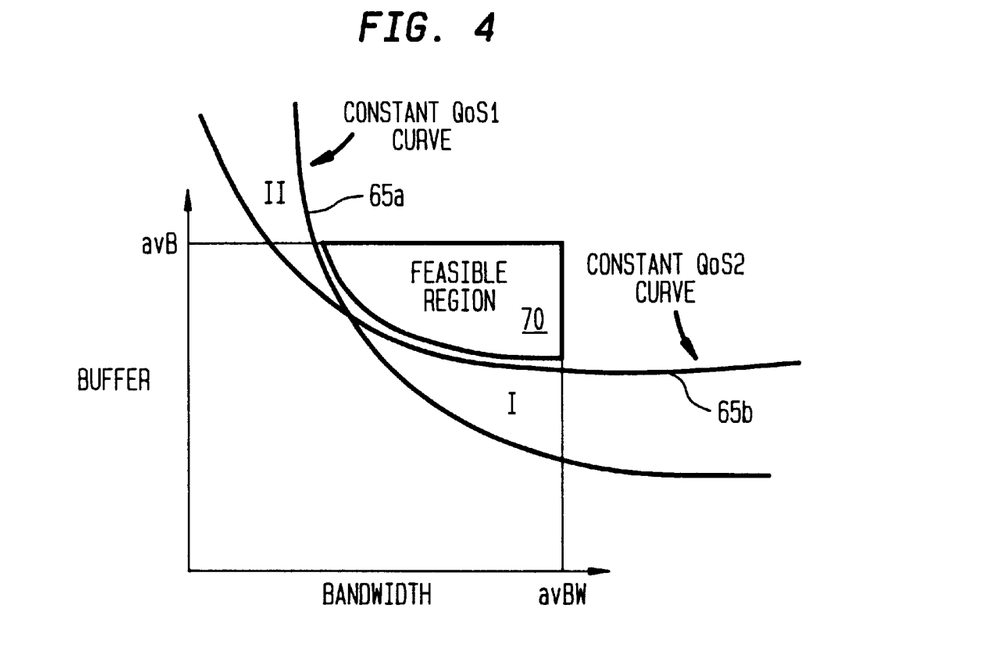
FIGS. 4 and 5 illustrate the buffer and bandwidth allocation at connection arrival instants taking into account multiple-QoS criteria.

The method 300 of FIG. 3 is designed to satisfy ATM services requiring satisfaction of multiple QoS criteria. Thus, as shown in FIG. 4, two QoS metric curves having respective feasible regions are computed by the underlying QoS computation engine with a first QoS curve 65a representing, e.g., cell delay variation, for the particular service class, and a second QoS curve 65b representing, e.g., cell loss ratio, for that service class. As shown in FIG. 4, the intersection of the respective feasible regions I and II for these two curves 65a and 65b is the total feasible region 70. For rt-VBR, where cell loss and delay are important criteria, an operating point would be chosen from region 70. For nrt-VBR where delay is not critical, the operating point may be selected from anywhere within region 70.

Figure 5:
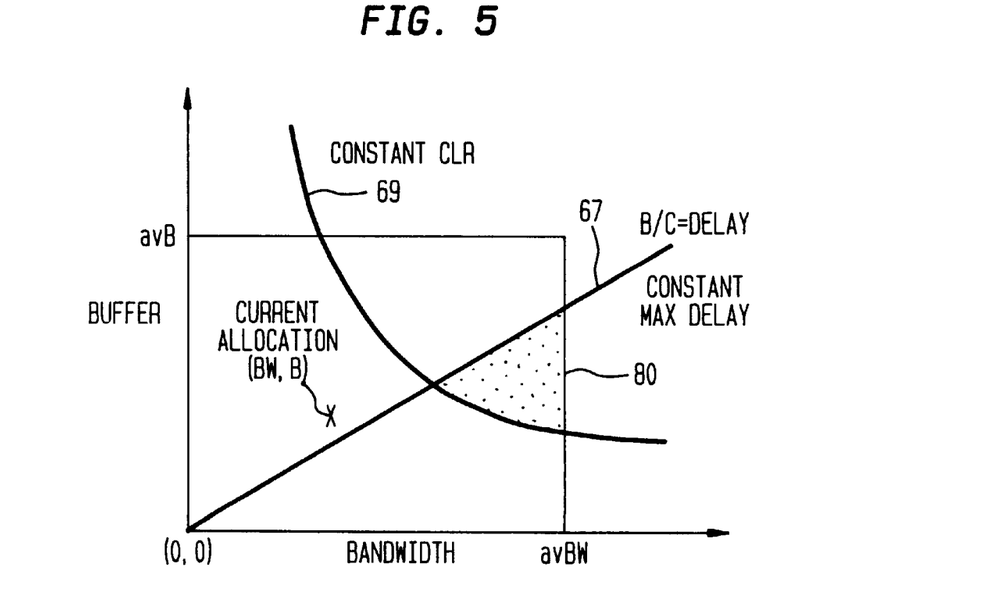

As would be evident to one skilled in the art, the extra computations to account for multiple QoS criteria are not unduly burdensome or time consuming and may be simplified, for example, in the case of cell delay variation. For example, as shown in FIG. 5, if given a buffer B being serviced at a rate C, then the worst case time necessary to completely empty the buffer is B/C and consequently the line 67 would represent the worst case delay for the buffer. If the operating point P(x,y) is computed to be within the feasible region 80 defined between the delay line 67 and QoS CLR metric curve 69, then the delay will never exceed this quantity (B/C). Any point on line 67 will cause exactly the delay of B/C.

Figure 6:
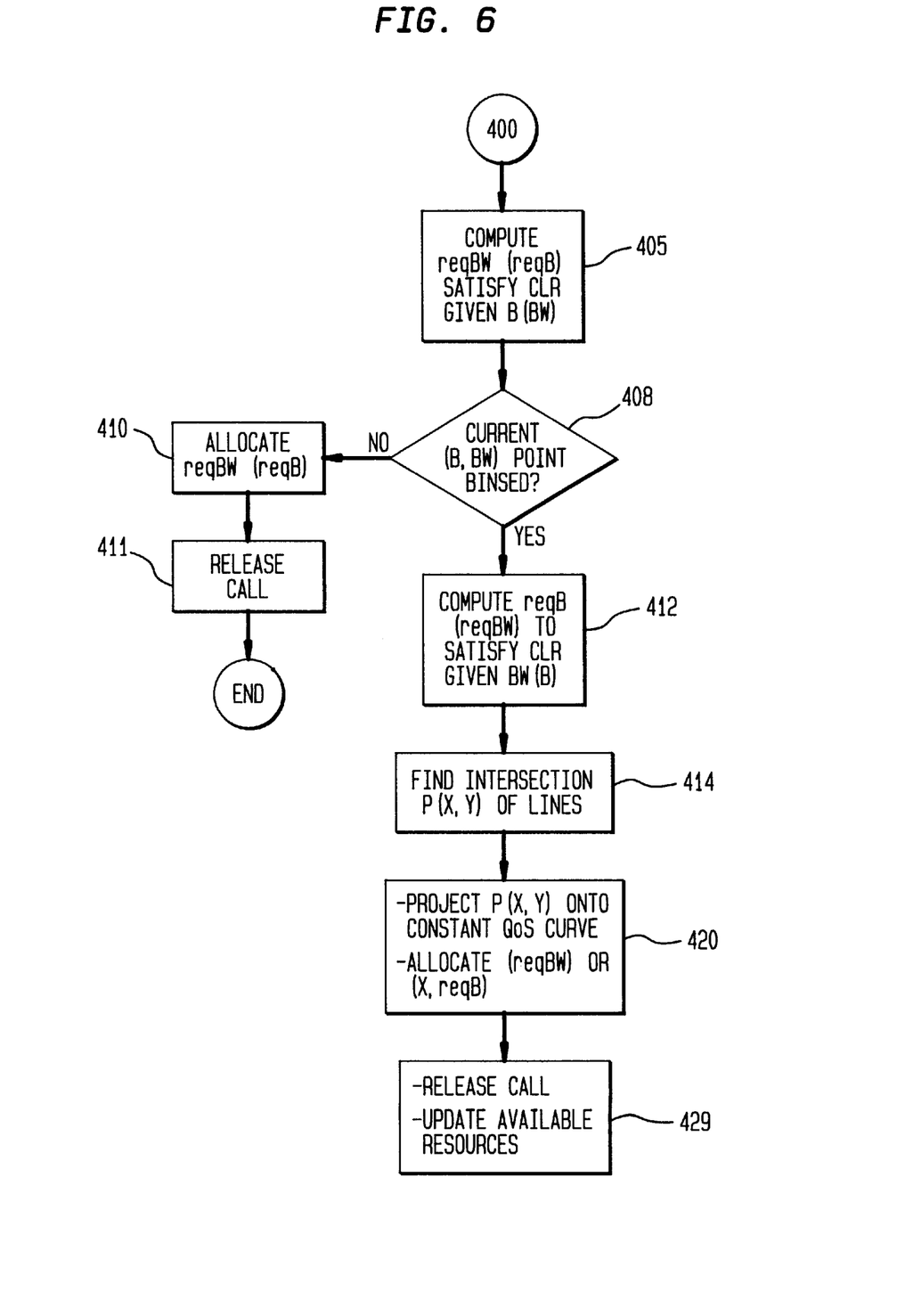
FIG. 6 illustrates the flow chart for dynamic allocation at buffer and bandwidth resource allocation at connection release instants.

FIG. 6 shows the set of steps 400 for implementing the present invention when a received call is a call release request. The essential mechanisms at connection release are the same as during connection arrivals, except that resources are released. Thus, at each connection release instant as indicated at step 405, the new $reqBW_{nrt-vbr}$ needed to support the QoS metric, e.g., CLR, is computed given the present buffer allocation of $B_{nrt-vbr}$ and assuming that $B_{nrt-vbr}$ is unchanged. Note that, as above, any desired CLR computation engine may be used to determine $reqBW_{nrt-vbr}$ in accordance with the fifth requirement. Next, at step 408, a decision is made as to whether the current operating point (req BW, B) is not unduly biased towards a large buffer allocation, similar to equation (1) above where small buffer allocation was of concern. If the current operating point is not unduly biased, then at step 410 the $reqBW_{nrt-VBR}$ is simply reduced without changing the buffer allocation $B_{nrt-vbr}$. Then, at step 411, the call is released and the aggregate available buffer and bandwidth resources for the multiple service classes are updated accordingly. It should be understood that if it is desired to keep the bandwidth allocation relatively constant and change only the buffer allocation, then the procedure implemented at step 405 would be reversed and the new buffer allocation would be determined with the bandwidth allocation unchanged. The condition of equation (1) is suitably modified to determine trigger points for the bandwidth re-allocation.

If, at step 408, it is determined that the current operating point (req BW, B) is unduly biased towards a large buffer allocation, or, that the first criteria of tight allocation does not have to be strictly adhered to and it is desired to limit the frequency of both bandwidth and buffer allocations as detailed in the sixth criteria, then the algorithm proceeds to step 412 to compute the new $reqB_{nrt-vbr}$ needed to support the CLR assuming bandwidth allocation $BW_{nrt-vbr}$ remains unchanged. Next, at step 414, a computation is made to find the intersection P=(x,y) of the line connecting ($BW_{nrt-VBR}$, $reqB_{nrt-VBR}$) and ($reqBW_{nrt-VBR}$, $B_{nrt-VBR}$), and the line connecting the current operating point ($Bw_{nrt-VBR}$, $B_{nrt-VBR}$) and the point ($avBW_{nrt-VBR}$ $avB_{nrt-VBR}$) in the manner as described above with respect to step 314. Then, at step 420, the required buffer (reqB) needed to satisfy the CLR constraint given computed bandwidth, x, is computed, and an allocation is made (x, reqB). Alternatively, at step 420, the required bandwidth (reqBW) needed to satisfy the CLR constraint given computed buffer, y, is computed and the allocation (reqBW, y) is made. Finally, at step 429, the call is released and the aggregate available buffer and bandwidth resources for the multiple service classes is updated accordingly. The algorithm then waits for the new connection setup or release request.

In accordance with the principles of the invention, simulations of a ATM switch implementing the algorithm were made in a single port, two queue system with both CBR and nrt-VBR classes. For simplicity, it was assumed that CAC for CBR traffic allocates a bandwidth equal to the sum of the PCRs for the CBR connections and a constant amount of buffer. The CAC computation engine for VBR traffic is based on the work described in K. M. Rege, "Equivalent Bandwidth and Related Admission Criteria for ATM systems—A Performance Study," *International Journal of Communication Systems*, Vol. 7, pp. 181–197, 1994, hereby incorporated by reference as if fully set forth herein.

Figure 7A:
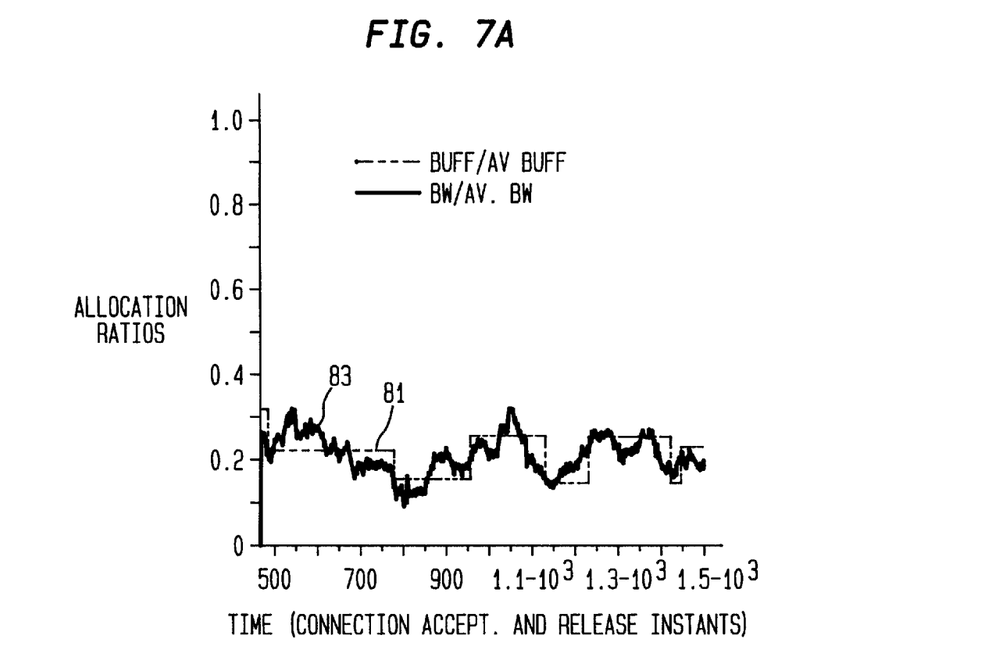
FIGS. 7(a) and 7(b) illustrates the simulation results for ATM switch implementing dynamic allocation at buffer and bandwidth resource for CBR and nrt-VBR.

FIG. 7 illustrates results of a first simulation taken with a stationary CBR and nrt-VBR traffic with identical call arrival rates and holding times, both of which are taken to be exponentially distributed. Particularly, the CBR call offered load and VBR call offered load were both 16. The CBR connection parameter was PCR=0.01 and the VBR connection parameters were PCR=0.0208, SCR=0.00312 and MBS=200. The link BW was 1.0 and the Link Buffer was 5000. Additionally, the algorithm was tuned to limit the frequency of changes in the buffer allocation for VBR traffic, indicated as line 81 in FIG. 7(a), with the bandwidth allocations indicated as line 83 being allowed to change as frequently as necessary. Specifically, FIG. 7(a) shows the bandwidth and buffer allocations to the VBR class as a fraction of their respective available resources. As can be seen, buffer re-allocations are limited in frequency and further that the fractional buffer and bandwidth allocations are always within a user-settable multiplicative factor, $F_a$=1.5 in this case, of each other.

Figure 7B:
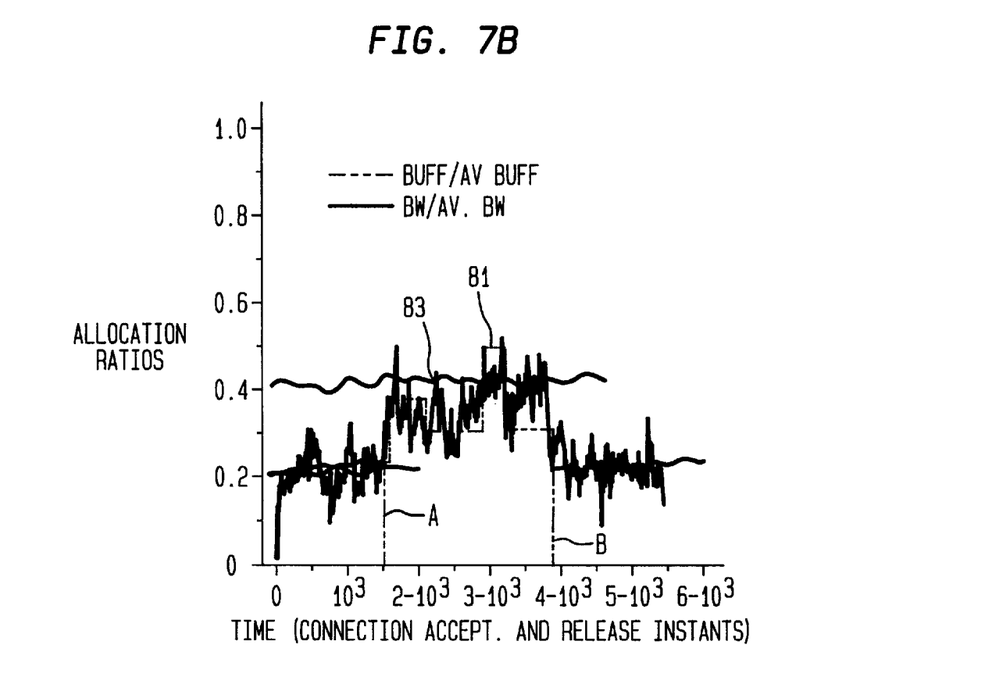

In a second simulation, the same settings were chosen except that the nrt-VBR traffic was non-stationary. The time-dependent traffic arrival rate for nrt-VBR was assumed to take the form of a step function with the rate doubling, at the $1483^{rd}$ connection arrival/release event and reverting back, e.g., at the $3808^{th}$ connection arrival/release event. FIG. 7(b) shows the fractional allocations of buffer and bandwidth indicated as lines 81 and 83, respectively. It can be seen that the allocations double almost immediately as the load increases at the $1483^{rd}$ connection arrival/release event, indicated at time A in FIG. 7(b) but drops back as the load goes away almost immediately as well, e.g., at time B in FIG. 7(b). Further, it can be seen that while the algorithm adjusts resource allocations in accordance with the traffic load, it also keeps the fractional buffer and bandwidth allocations within the given multiplicative factor $F_a$ as desired.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for dynamically allocating available buffer and bandwidth resources in an ATM switch having a multi-class queue capable of servicing one or more ATM service classes, each said ATM service class having one or more QoS service requirements associated therewith, said method comprising:

a) determining receipt of a connection setup request for a particular ATM service class;

b) computing from a given current traffic, said QoS requirements and said available buffer and bandwidth resources, a new allocation of shared buffer resources (B) and bandwidth resources (BW) for said particular ATM service class; and, c) allocating said buffer and bandwidth resources.

2. A method for dynamically allocating buffer and bandwidth resources as claimed in claim 1, further comprising the step of updating said currently available amount of available buffer and bandwidth resources for said one or more ATM service classes after said allocating resources step.

3. A method for dynamically allocating buffer and bandwidth resources as claimed in claim 1, wherein said computing step further comprises controlling the rate at which a selected one of said shared bandwidth resources and buffer resources are to be allocated until it is determined that the current bandwidth BW and buffer B resource allocation is biased towards a larger one of buffer and bandwidth allocation, respectively.

4. A method for dynamically allocating buffer and bandwidth resources as claimed in claim 3, wherein the step of determining whether the current bandwidth BW and buffer B resource allocation is biased includes the step of determining whether the condition $$B/avB > F_a * BW/avBW$$

is satisfied, wherein $F_a$ is a rate control factor and B and BW are current allocations of buffer resources and bandwidth resources, respectively.

5. A method for dynamically allocating buffer and bandwidth resources as claimed in claim 4, wherein if said condition is not satisfied, the step of controlling bandwidth resource BW allocation by allocating reqB to satisfy QoS service requirement given current allocation of bandwidth resource BW.

6. A method for dynamically allocating buffer and bandwidth resources as claimed in claim 3, wherein the step of determining whether the current bandwidth BW and buffer B resource allocation is biased includes the step of determining whether the condition $$BW/avBW > F_a * B/avB$$

is satisfied, wherein $F_a$ is a rate control factor and B and BW are current allocations of buffer resources and bandwidth resources respectively.

7. A method for dynamically allocating buffer and bandwidth resources as claimed in claim 6, wherein if said condition is not satisfied, the step of controlling buffer resource B allocation by allocating reqBW to satisfy QoS service requirement given current allocation of buffer resource B.

8. A method for dynamically allocating buffer and bandwidth resources as claimed in claim 4, wherein said computing step b) includes the steps of:

obtaining a plurality of feasible new buffer and bandwidth allocation combinations capable of satisfying QoS service requirement for said particular ATM service class without exceeding each respective said current avB and avBW resources; and selecting one of said plurality of feasible new buffer and bandwidth allocation combinations.

9. A method for dynamically allocating buffer and bandwidth resources as claimed in claim 8, further including the step of determining whether tight or loose buffer and bandwidth resource allocations are acceptable, wherein said computing step b) includes selecting one of said plurality of new feasible buffer and bandwidth allocation combinations and, determining a required bandwidth resource allocation reqBW given current buffer B resource allocation.

10. A method for dynamically allocating buffer and bandwidth resources as claimed in claim 8, further including the step of determining whether tight or loose buffer and bandwidth resource allocations are acceptable, wherein said computing step b) includes selecting one of said plurality of feasible new buffer and bandwidth allocation combinations and, determining a required buffer resource allocation reqB given current bandwidth BW resource allocation.

11. A method for dynamically allocating buffer and bandwidth resources as claimed in claim 8, further including the step of obtaining a plurality of feasible buffer and bandwidth allocations representing approximate equal allocations of said buffer and bandwidth resources for said ATM service type, and wherein said computing step b) includes selecting one of said plurality of feasible new buffer and bandwidth allocation combinations representing approximate equal allocations.

12. A method for dynamically allocating buffer and bandwidth resources as claimed in claim 11, wherein said computing step b) includes obtaining a plurality of feasible new buffer and bandwidth allocation combinations including determining a first locus of feasible new buffer and bandwidth allocations points including reqB, BW and B, reqBW and points therebetween, and a second locus of equal proportion buffer and bandwidth allocations including the current bandwidth resource allocation B, BW and the available buffer and bandwidth avB, avBW and points therebetween, and determining an intersection of said first locus and second locus to obtain a new allocation of said shared buffer resources (B) and bandwidth resources (BW) for said particular ATM service class.

13. A method for dynamically allocating buffer and bandwidth resources as claimed in claim 12, further comprising the step of computing the required buffer (req B) or required bandwidth (req BW) resources, by fixing one ordinate of said intersection and allocating one of said resources according to a point on said first locus of points.

14. A method for dynamically de-allocating buffer and bandwidth resources in an ATM switch having a multi-class queue capable of servicing one or more ATM service classes, each said ATM service class having one or more QoS service requirements associated therewith, said method comprising:

a) determining receipt of a connection setup release for a particular ATM service class;

b) computing from a given current traffic, said QoS requirements and an available buffer (avB) and bandwidth (avBW), an amount of shared buffer resources (B) and bandwidth resources (BW) available for a particular ATM service class; and, c) de-allocating said new amount of said buffer and bandwidth resources.

* * * * *